United States Patent
Ho et al.

(10) Patent No.: US 8,253,804 B2
(45) Date of Patent: Aug. 28, 2012

(54) ELECTRONIC DEVICE AND METHOD FOR MEASURING VIDEO SIGNALS

(75) Inventors: Jui-Hsiung Ho, Taipei Hsien (TW); Wang-Ding Su, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 358 days.

(21) Appl. No.: 12/750,678

(22) Filed: Mar. 30, 2010

(65) Prior Publication Data
US 2011/0050907 A1 Mar. 3, 2011

(30) Foreign Application Priority Data
Aug. 28, 2009 (CN) .......................... 2009 1 0306246

(51) Int. Cl.
*H04N 17/00* (2006.01)

(52) U.S. Cl. ........ 348/180; 348/189; 348/192; 348/185; 455/423

(58) Field of Classification Search ................... 348/180, 348/189, 192, 181, 185; 455/226.1, 423, 455/115.1; 370/241; 375/224
See application file for complete search history.

(56) References Cited

U.S. PATENT DOCUMENTS

| | | | | |
|---|---|---|---|---|
| 8,094,647 | B2 * | 1/2012 | Elliott et al. | 370/352 |
| 2007/0088516 | A1 * | 4/2007 | Wolf et al. | 702/81 |

\* cited by examiner

*Primary Examiner* — Jefferey Harold
*Assistant Examiner* — Jean W Desir
(74) *Attorney, Agent, or Firm* — Altis Law Group, Inc.

(57) ABSTRACT

An electronic device includes a video signal detection system to measure video signals. A measurement method can measure the video signals by using the electronic device. The measurement method sets measurement parameters that are used to measure video signals. Furthermore, the measurement method generates measurement results that each corresponds to a video signal transmission channel between the electronic device and a video signal processing device. In addition, the measurement method generates a measurement report according to all the measurement results.

15 Claims, 10 Drawing Sheets

| Video signal name | | Measuring items | Maximum value | Medium value | Minimum value | Unit |
|---|---|---|---|---|---|---|
| RED | Video Output | High | 672.227200m | 670.064900m | 667.716100m | V |
| | | Low | -9.583300m | -12.428000m | -14.835800m | V |
| | | Overshoot | 5.215800 | 2.936900 | 2.164900 | % |
| | | Undershoot | 5.905000 | 4.193000 | 2.836300 | % |
| | | Rise Time | 8.095600n | 7.738900n | 7.113000n | s |
| | | Fall Time | 6.226200n | 5.879600n | 5.426500n | s |
| | | Setting Time After Overshoot | 0.000000 | 0.000000 | 0.000000 | s |
| | | Setting Time After Undershoot | 0.000000 | 0.000000 | 0.000000 | s |
| | | to Green Skew | 241.822100p | -45.737700p | -296.377300p | s |
| | | to Green Mismatch | -13.192500m | -14.034200m | -15.041300m | V |
| | H Timing | Back porch | 3.225300u | 3.224200u | 3.222200u | s |
| | | Addressable video | 16.159400u | 16.158100u | 16.156400u | s |
| | | Front Porch | -327.667200n | -329.816500n | -332.803500n | s |
| | V Timing | Back porch | 452.802600u | 452.762400u | 452.5953u | s |
| | | Addressable video | 12.796200m | 12.792200m | 12.791900m | s |
| | | Front Porch | -21.637700u | -21.657600u | -21.680500u | s |
| | | Non-Monotonic | Fail | Fail | | |
| | | Glitch | Conditional Pass | Pass | | |
| | | Ringback | Pass | Pass | | |

FIG. 6

ELECTRONIC DEVICE AND METHOD FOR MEASURING VIDEO SIGNALS

BACKGROUND

1. Technical Field

Embodiments of the present disclosure generally relate to measurement systems, and more particularly, to an electronic device and a method for measuring video signals using the electronic device.

2. Description of Related Art

A video signal processing device, such as a video recorder and a computer, can process video signals received from a video signal generator. The video signal processing device may be tested on performance by a video signal measurement before the video signal processing device is distributed into the consumer market.

However, presently, the video signal measurement of the video signal processing device must be performed individually, and a lot of manual work is required during the video signal measurement. This video signal measurement is thus inefficient and incorrect, leading to an inaccurate performance test.

BRIEF DESCRIPTION OF THE DRAWINGS

FIG. 6 illustrates one embodiment of a measurement report generated by the video signal detection system of FIG. 1.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, each "step" described below, is operative under the controlling of a corresponding "module." The word "module," as described herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
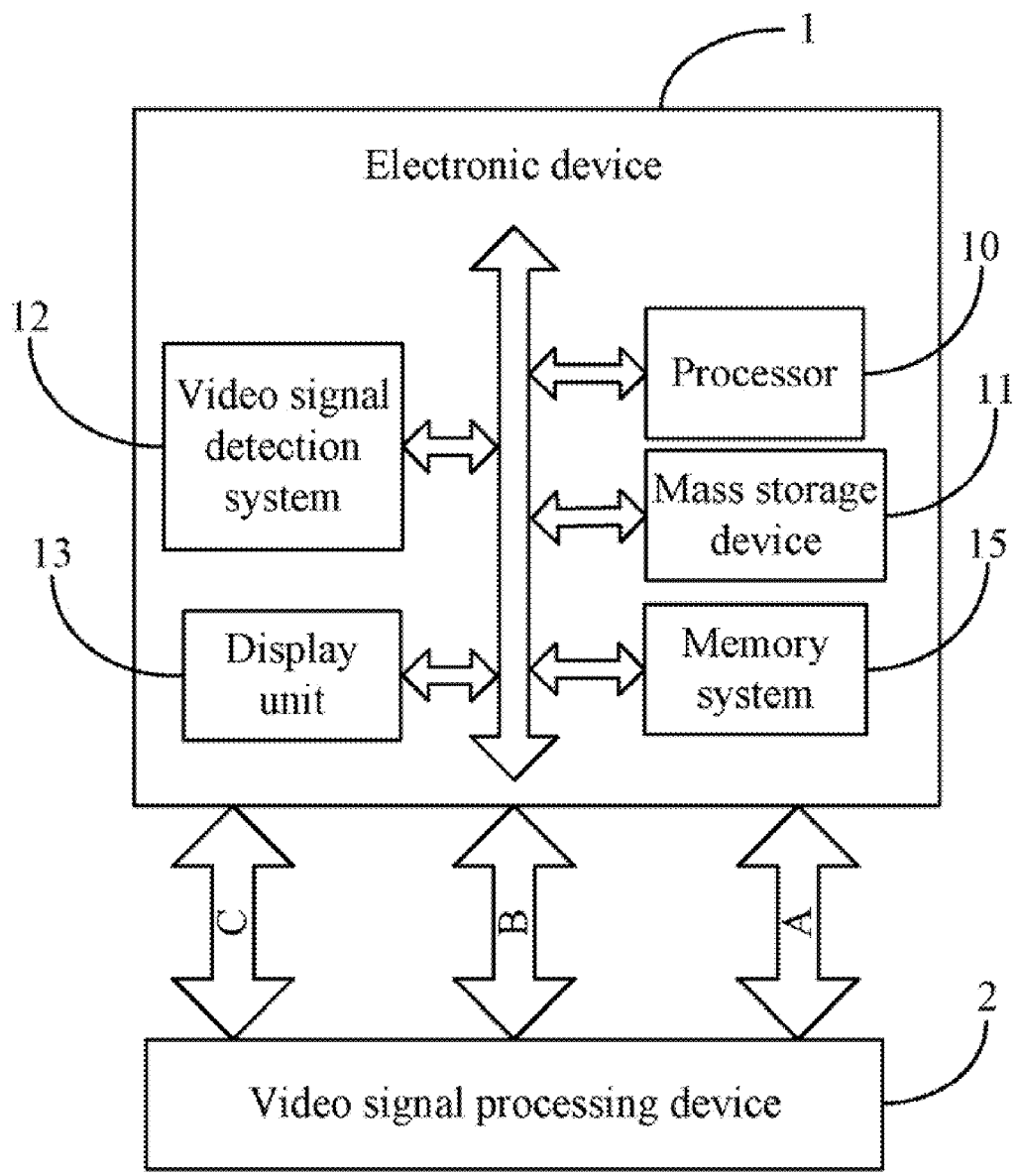
FIG. 1 is a block diagram of one embodiment of an electronic device for measuring video signals.

FIG. 1 is a block diagram of one embodiment of an electronic device 1. The electronic device 1 communicates with a video signal processing device 2 through a plurality of video signal transmission channels, for example, as shown in FIG. 1, the transmission channels A, B, and C. The electronic device 1 may include a video signal detection system 12, and a display unit 13. The video signal detection system 12 is used to measure video signals transmitted through the video signal transmission channels. The display unit 13 is used to generate a display interface that displays a wave shape of video signals.

The electronic device 1 may be a computer, a server, a mobile phone, or a personal digital assistant (PDA), for example. In the embodiment, the electronic device 1 may include a memory system 15, such as a random access memory (RAM) for temporary storage of information and/or a read only memory (ROM) for permanent storage of information, and/or a mass storage device 11, such as a hard drive, or optical media storage device. The mass storage device 11 may comprise one or more hard disk drives, optical drive, networked drive, or some combination of various digital storage systems. In the embodiment, the mass storage device 11 may store the video signal detection system 12, video signal data, and needed data generated by the video signal detection system 12. The electronic device 1 may also include at least one processor 10 for computation during the process of measuring video signals. The memory system 15 or the mass storage device 11 may include one or more function modules to implement the video signal detection system 12. The above mentioned components may be coupled by one or more communication buses or signal lines. It should be apparent that FIG. 1 is only one example of an architecture for the electronic device 1 that can be included with more or fewer components than shown, or a different configuration of the various components.

The electronic device 1 is generally controlled and coordinated by an operating system, such as the UNIX, Linux, Windows 95, 98, NT, 2000, XP, Vista, Mac OS X, an embedded operating system, or any other compatible operating systems. In other embodiments, the electronic device 1 may be controlled by a proprietary operating system.

Figure 2:
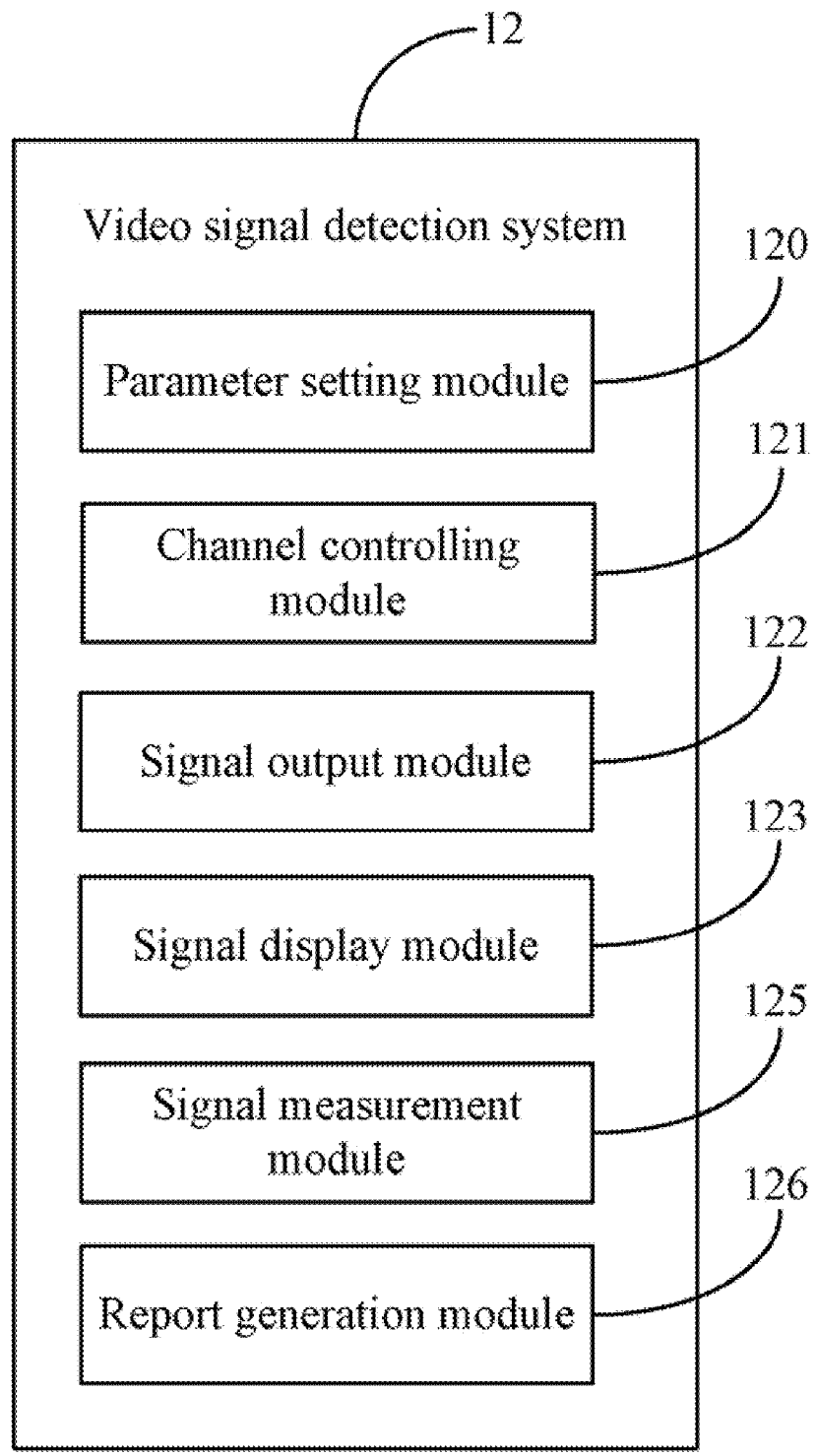
FIG. 2 is a block diagram of functional modules of a video signal detection system of FIG. 1.

FIG. 2 is a block diagram of the function modules of the video signal detection system 12. In one embodiment, the video signal detection system 12 includes a parameter setting module 120, a channel controlling module 121, a signal output module 122, a signal display module 123, a signal measurement module 125, and a report generation module 126.

The parameter setting module 120 sets a plurality of measurement parameters that are used to measure video signals. In the embodiment, the set measurement parameters include video signal types that need to be measured, a video signal transmission channel corresponding to each of the video signal types, measurement items of each of the video signal types, measurement items of each image for measurement, measurement times for measuring each video signal transmission channel, and a resolution of the electronic device 1 corresponding to each video signal transmission channel.

Figure 7:
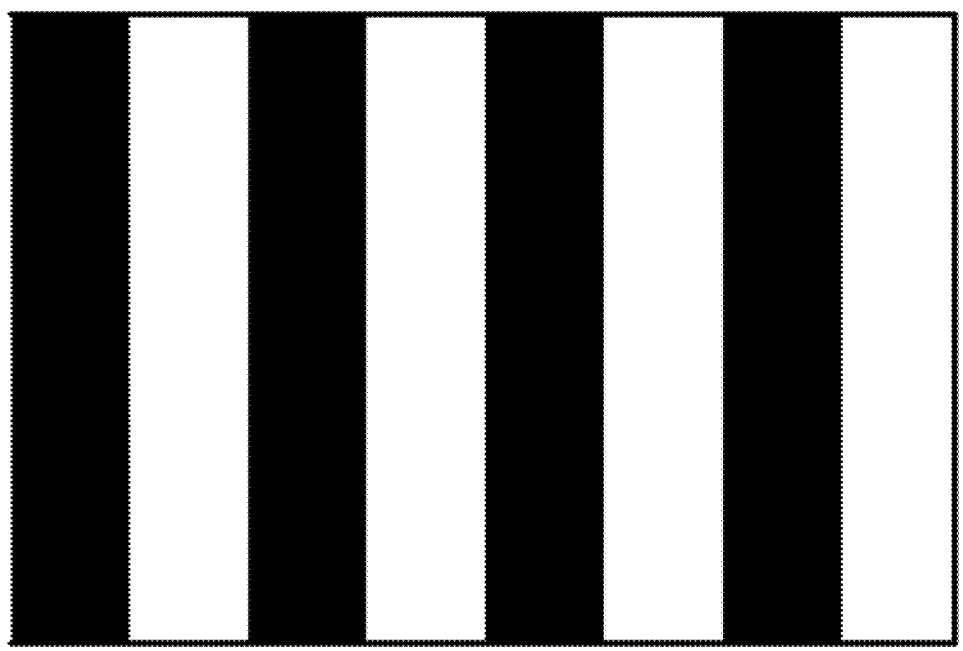
FIG. 7 illustrates one embodiment of a black-and-white image.
Figure 8:
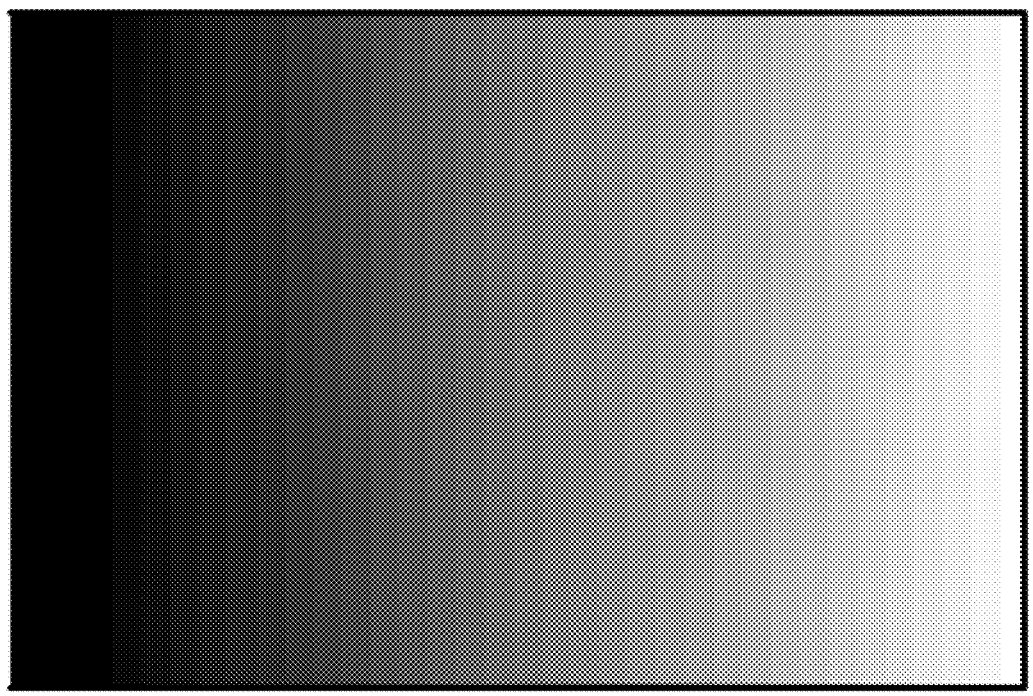
FIG. 8 illustrates one embodiment of a black-to-white image.
Figure 9:
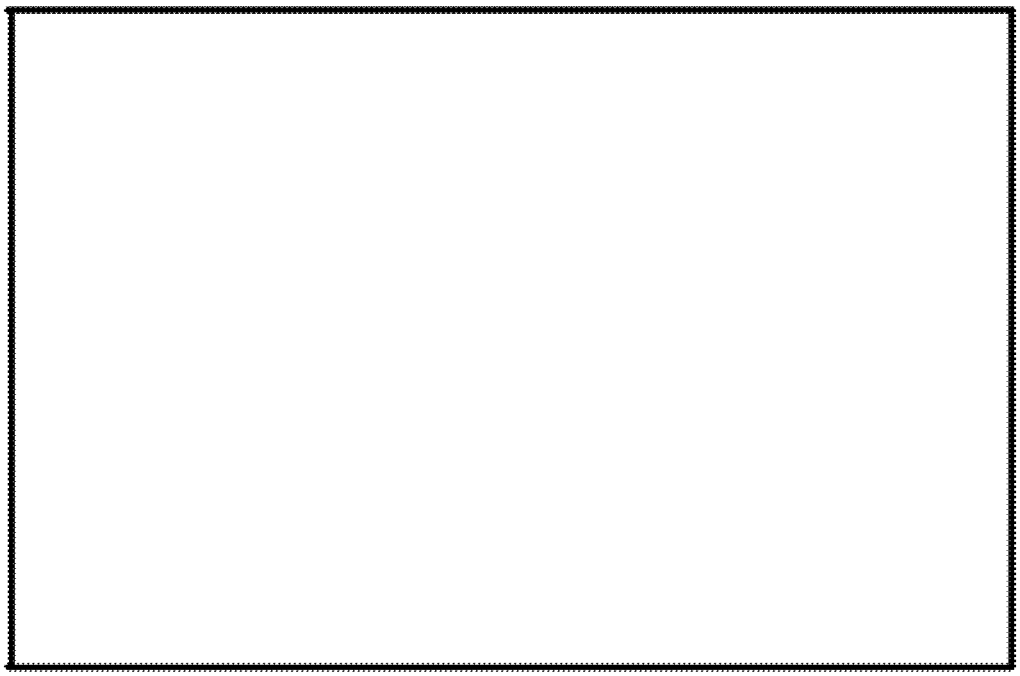
FIG. 9 illustrates one embodiment of a white image.

For example, as shown in FIG. 6, the video signal transmission channel A may correspond to the video signal type "RED." The video signal type "RED" may correspond to measurement items from "High" to "Ringback." The measurement items from "High" to "to Green Skew" may correspond to a black-and-white image, for example, as it is shown in FIG. 7. The measurement item "to Green Mismatch" may correspond to a black-to-white image, for example, as it is shown in FIG. 8. The measurement items from "Back Porch" to "Ringback" may correspond to a white image, for example, as it is shown in FIG. 9.

The channel controlling module 121 selects a video signal transmission channel between the electronic device 1 and the video signal processing device 2 according to the set parameters. For example, the channel controlling module 121 selects the video signal transmission channel A.

Figure 10:
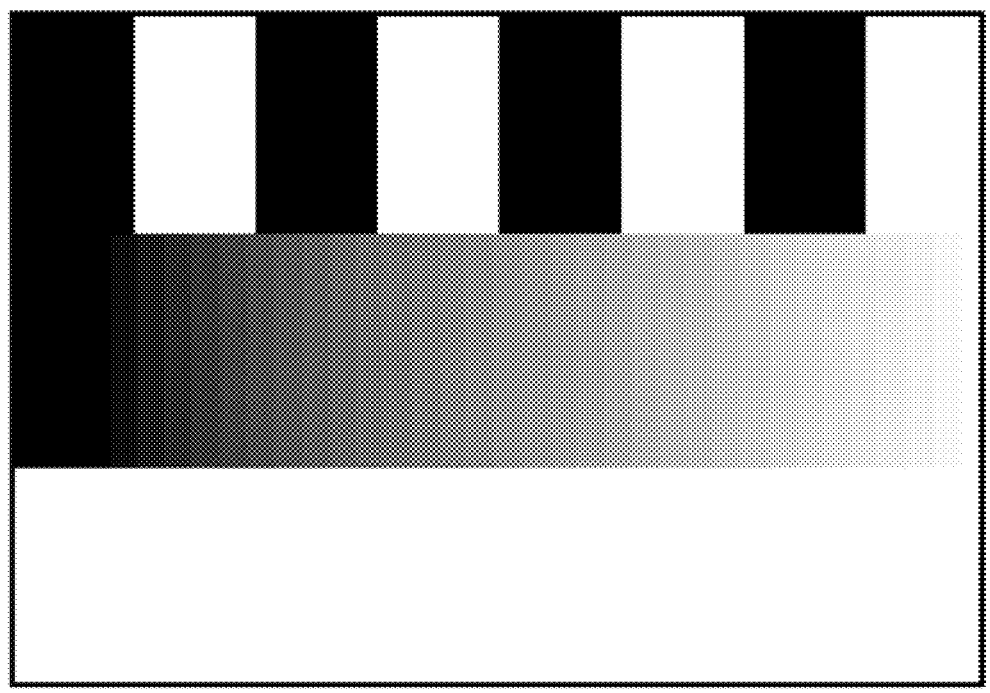
FIG. 10 illustrates one embodiment of a composite image.

The signal output module 122 determines a measurement item of the selected video signal transmission channel, and selects an image according to the measurement item. Furthermore, the signal output module 122 transmits video signals of the image to the video signal processing device 2 by the selected video signal transmission channel. In the embodiment, the image is a composite image that is integrated by a black-and-white image, a black-to-white image, and a white image. For example, the composite image is shown in FIG. 10. In another embodiment, the image is selected from the group consisting of a black-and-white image, a black-to-white image, and a white image.

The signal display module 123 detects the transmitted video signals, and regulates a wave shape of the detected video signals to occupy a whole display interface of the display unit 13. Furthermore, the signal display module 123 regulates a resolution of the whole display interface according to the set parameters.

The signal measuring module 125 measures the detected video signals according to the measurement item and the regulated wave shape, to generate a measurement result corresponding to the measurement item of the selected video signal transmission channel. Furthermore, the signal measurement module 125 analyzes whether all the measurement items corresponding to the selected video signal transmission channel have been measured. In addition, the signal measurement module 125 analyzes whether the measurement of the selected video signal transmission channel has been completed according to the measurement times, and analyzes whether all the video signal transmission channels have been measured.

The report generation module 126 generates a measurement report according to all the measurement results.

Figure 3:
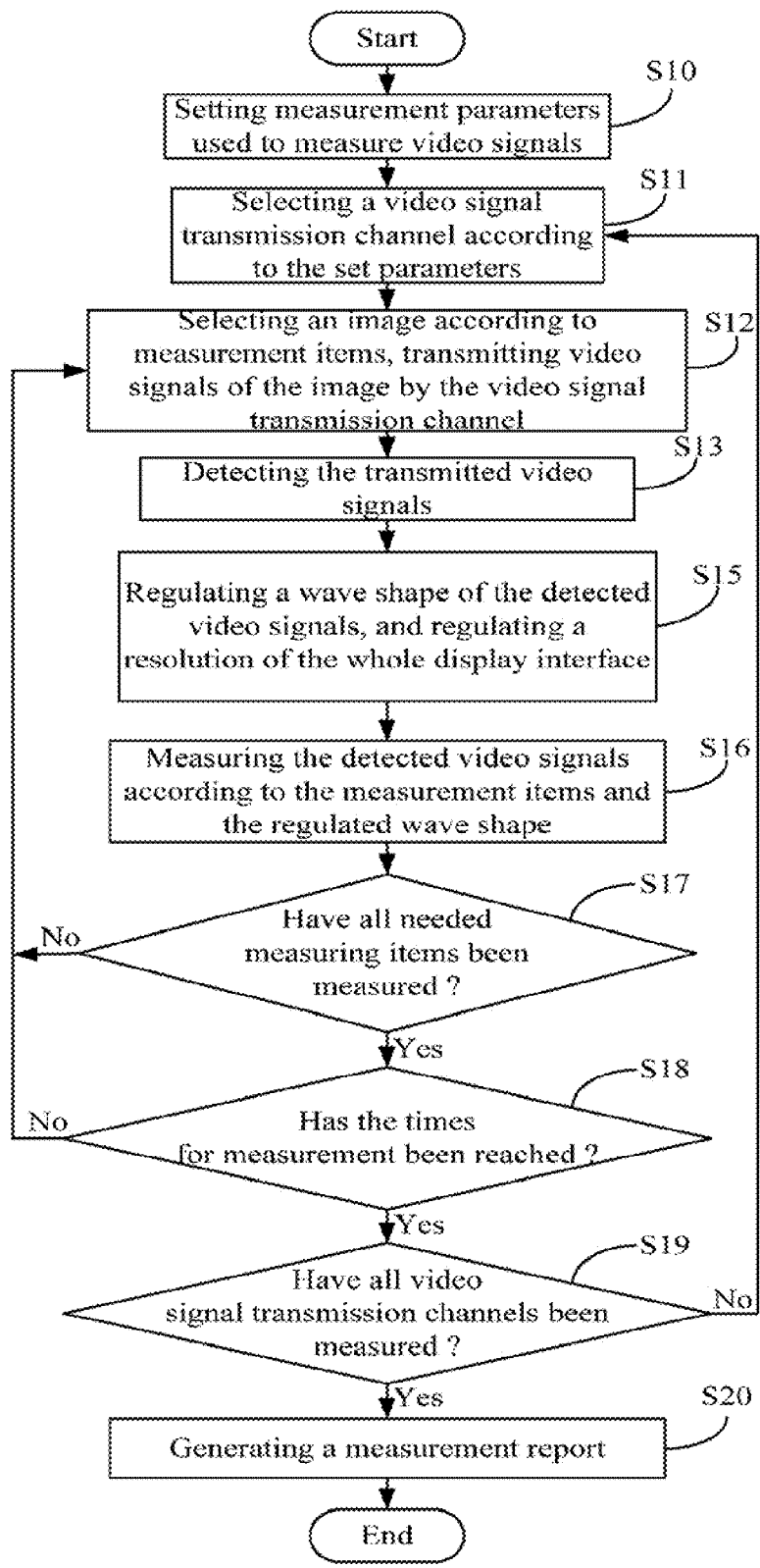
FIG. 3 is a flowchart illustrating one embodiment of a method for measuring video signals using an electronic device such as, for example, that of FIG. 1.
Figure 4:
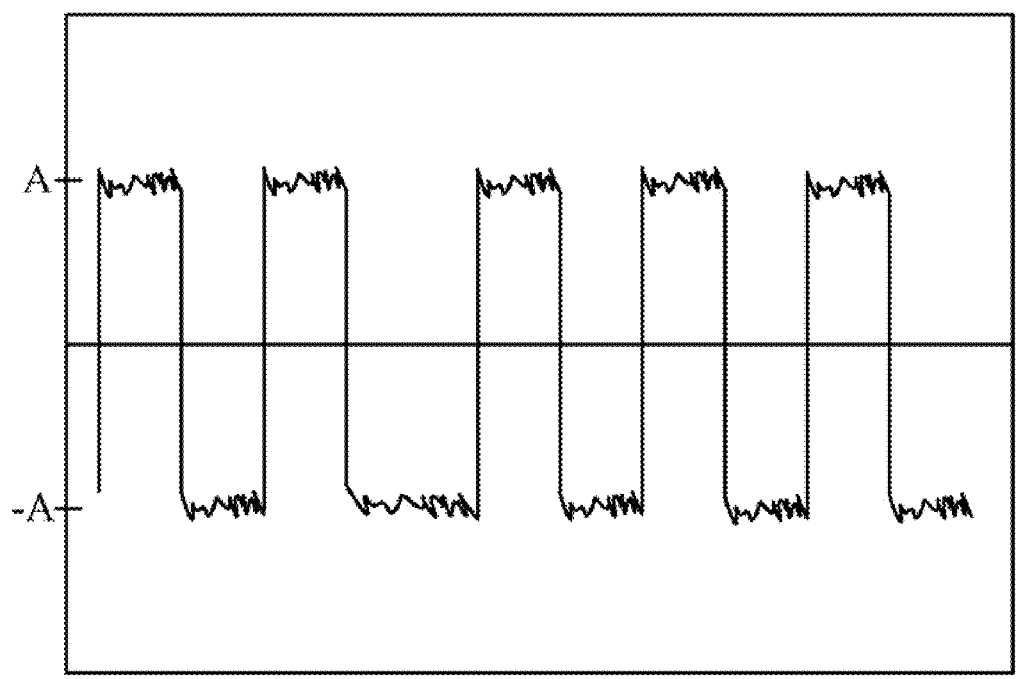
FIG. 4 illustrates one embodiment of a display interface that displays original wave shape of video signals.
Figure 5:
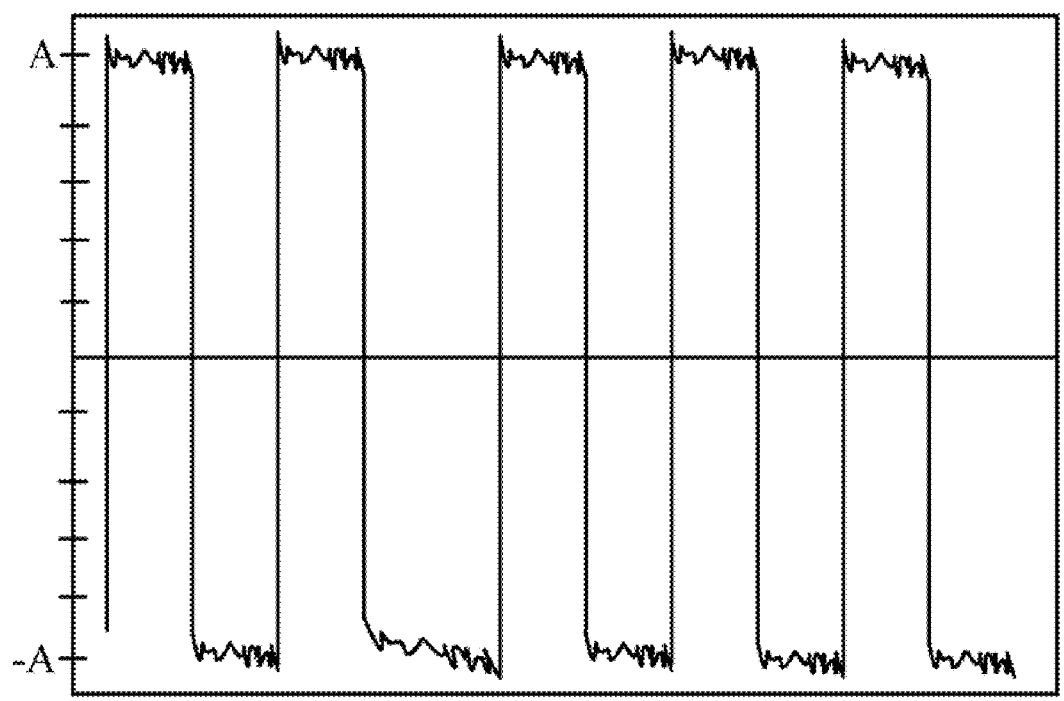
FIG. 5 illustrates one embodiment of the display interface that displays regulated wave shape of the video signals of FIG. 4.

FIG. 3 is a flowchart illustrating one embodiment of a method for measuring video signals by using the electronic device 1. In the embodiment, the video signal detection system 12 comprises one or more computerized codes that are stored in the video signal detection system 12 and executable by the at least one processor 10 of the electronic device 1 to perform the method. Depending on the embodiment, additional blocks in the flow of FIG. 3 may be added, others removed, and the ordering of the blocks may be changed.

In block S10, the parameter setting module 120 sets a plurality of measurement parameters that are used to measure video signals. In the embodiment, the set measurement parameters include video signal types that need to be measured, a video signal transmission channel corresponding to each of the video signal types, measurement items of each of the video signal types, measurement items of each image for measurement, measurement times for measuring each video signal transmission channel, and a resolution of the electronic device 1 corresponding to each video signal transmission channel.

In block S11, the channel controlling module 121 selects a video signal transmission channel between the electronic device 1 and the video signal processing device 2 according to the set parameters.

In block S12, the signal output module 122 determines a measurement item of the selected video signal transmission channel, and selects an image according to the measurement item. Furthermore, the signal output module 122 transmits video signals of the image to the video signal processing device 2 by the selected video signal transmission channel.

In block S13, the signal display module 123 detects the transmitted video signals.

In block S15, the signal display module 123 regulates a wave shape of the detected video signals to occupy a whole display interface of the display unit 13. Furthermore, the signal display module 123 regulates a resolution of the whole display interface according to the set measurement parameters.

In block S16, the signal measuring module 125 measures the detected video signals according to the measurement item and the regulated wave shape, to generate a measurement result corresponding to the measurement item of the selected video signal transmission channel.

In block S17, the signal measuring module 125 analyzes whether all the measurement items corresponding to the selected video signal transmission channel have been measured.

If all the measuring items corresponding to the selected video signal transmission channel have been measured, block S18 is implemented. If any measurement item corresponding to the selected video signal transmission channel has not been measured, block S12 is repeated.

In block S18, the signal measuring module 125 analyzes whether the measurement of the selected video signal transmission channel has been completed according to the times of measurement.

If the measurement of the selected video signal transmission channel has been completed, block S19 is implemented. If the measurement of the selected video signal transmission channel has not been completed, block S12 is repeated.

In block S19, the signal measuring module 125 analyzes whether measurements of all the video signal transmission channels have been completed.

If the measurements of all the video signal transmission channels have been completed, block S20 is implemented. If a measurement of a video signal transmission channel has not been completed, block S11 is repeated.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
    at least one storage system and at least one processor; and
    a video signal detection system stored in the at least one storage system, and being executable by the at least one processor to measure video signals;
    the video signal detection system comprising:
        a parameter setting module operable to set measurement parameters that are used to measure video signals;
        a channel controlling module operable to select a video signal transmission channel between the electronic device and a video signal processing device according to the set parameters;
        a signal output module operable to determine a measurement item of the selected video signal transmission channel, select an image according to the measurement item, and transmit video signals of the image to the video signal processing device by the selected video signal transmission channel;

a signal display module operable to detect the transmitted video signals, regulate a wave shape of the detected video signals to occupy a whole display interface of the electronic device, and regulate a resolution of the whole display interface according to the measurement parameters;

a signal measuring module operable to measure the detected video signals according to the measurement item and the regulated wave shape, to generate a measurement result corresponding to the measurement item of the selected video signal transmission channel; and a report generation module operable to generate a measurement report according to all measurement results.

2. The electronic device as described in claim 1, wherein the measurement parameters comprise video signal types that need to be measured, a video signal transmission channel corresponding to each of the video signal types, measurement items of each of the video signal types, measurement items of each image for measurement, measurement times for measuring each video signal transmission channel, and a resolution of the electronic device corresponding to each video signal transmission channel.

3. The electronic device as described in claim 2, wherein the signal measurement module is further operable to:
 (a) analyzing whether all the measurement items corresponding to the selected video signal transmission channel have been measured;
 (b) analyzing whether the measurement of the selected video signal transmission channel has been completed according to the measurement times, if all the measurement items corresponding to the selected video signal transmission channel have been measured;
 (c) analyzing whether all the video signal transmission channels have been measured, if the measurement of the selected video signal transmission channel has been completed.

4. The electronic device as described in claim 2, wherein each image for measurement is selected from the group consisting of a black-and-white image, a black-to-white image, and a white image.

5. The electronic device as described in claim 2, wherein each image for measurement is a composite image that is integrated by a black-and-white image, a black-to-white image, and a white image.

6. A method for measuring video signals using an electronic device, the method comprising:
 (i1) setting measurement parameters that are used to measure video signals;
 (i2) selecting a video signal transmission channel between the electronic device and a video signal processing device according to the measurement parameters;
 (i3) determining a measurement item of the selected video signal transmission channel, selecting an image according to the measurement item, and transmitting video signals of the image to the video signal processing device by the selected video signal transmission channel;
 (i4) detecting the transmitted video signals, regulating a wave shape of the detected video signals to occupy a whole display interface of the electronic device, and regulating a resolution of the whole display interface according to the measurement parameters;
 (i5) measuring the detected video signals according to the measurement item and the regulated wave shape, to generate a measurement result corresponding to the measurement item of the selected video signal transmission channel;
 (i6) repeating the steps of (i2), (i3), (i4) and (i5), until all measurement items of the selected video signal transmission channel have been measured;
 (i7) repeating the steps of (i2), (i3), (i4), (i5) and (i6), until all video signal transmission channels between the electronic device and the video signal processing device have been measured; and
 (i8) generating a measurement report according to all measurement results.

7. The method as described in claim 6, wherein the measurement parameters comprise video signal types that need to be measured, a video signal transmission channel corresponding to each of the video signal types, measurement items of each of the video signal types, measurement items of each image for measurement, measurement times for measuring each video signal transmission channel, and a resolution of the electronic device corresponding to each video signal transmission channel.

8. The method as described in claim 7, wherein the step (i6) further comprises:
 (a) analyzing whether all the measurement items corresponding to the selected video signal transmission channel have been measured; and
 (b) analyzing whether the measurement of the selected video signal transmission channel has been completed according to the measurement times, if all the measurement items corresponding to the selected video signal transmission channel have been measured.

9. The method as described in claim 7, wherein each image for measurement is selected from the group consisting of a black-and-white image, a black-to-white image, and a white image.

10. The method as described in claim 7, wherein each image for measurement is a composite image that is integrated by a black-and-white image, a black-to-white image, and a white image.

11. A non-transitory storage medium having stored thereon instructions that, when executed by a processor of an electronic device, causing the electronic device to perform a method for measuring video signals, wherein the method comprises:
 (i1) setting measurement parameters that are used to measure video signals;
 (i2) selecting a video signal transmission channel between the electronic device and a video signal processing device according to the measurement parameters;
 (i3) determining a measurement item of the selected video signal transmission channel, selecting an image according to the measurement item, and transmitting video signals of the image to the video signal processing device by the selected video signal transmission channel;
 (i4) detecting the transmitted video signals, regulating a wave shape of the detected video signals to occupy a whole display interface of the electronic device, and regulating a resolution of the whole display interface according to the measurement parameters;
 (i5) measuring the detected video signals according to the measurement item and the regulated wave shape, to generate a measurement result corresponding to the measurement item of the selected video signal transmission channel;

(i6) repeating the steps of (i2), (i3), (i4) and (i5), until all measurement items of the selected video signal transmission channel have been measured;

(i7) repeating the steps of (i2), (i3), (i4), (i5) and (i6), until all video signal transmission channels between the electronic device and the video signal processing device have been measured; and (i8) generating a measurement report according to all measurement results.

12. The storage medium as described in claim 11, wherein the measurement parameters comprise video signal types that need to be measured, a video signal transmission channel corresponding to each of the video signal types, measurement items of each of the video signal types, measurement items of each image for measurement, measurement times for measuring each video signal transmission channel, and a resolution of the electronic device corresponding to each video signal transmission channel.

13. The storage medium as described in claim 12, wherein the step (i6) further comprises:

(a) analyzing whether all the measurement items corresponding to the selected video signal transmission channel have been measured; and (b) analyzing whether the measurement of the selected video signal transmission channel has been completed according to the measurement times, if all the measurement items corresponding to the selected video signal transmission channel have been measured.

14. The storage medium as described in claim 12, wherein each image for measurement is selected from the group consisting of a black-and-white image, a black-to-white image, and a white image.

15. The storage medium as described in claim 12, wherein each image for measurement is a composite image that is integrated by a black-and-white image, a black-to-white image, and a white image.

* * * * *